(12) United States Patent
Möller et al.

(10) Patent No.: US 6,424,108 B1
(45) Date of Patent: Jul. 23, 2002

(54) METHOD FOR OPERATING AN ACTUATING DRIVE

(75) Inventors: Herbert Möller, Bad Oeynhausen;
Günther Unterberg, Petershagen;
Andreas Stelter, Minden, all of (DE)

(73) Assignee: ABB Automation Inc., Norwalk, CT (US)

( * ) Notice: Subject to any disclaimer, the term of this patent is extended or adjusted under 35 U.S.C. 154(b) by 41 days.

(21) Appl. No.: 09/742,630

(22) Filed: Dec. 20, 2000

(30) Foreign Application Priority Data

Jan. 5, 2000 (DE) .......................... 100 00 182

(51) Int. Cl.[7] .............................................. H02P 7/632
(52) U.S. Cl. ..................... 318/432; 318/471; 318/808
(58) Field of Search ................................. 318/432, 433, 318/471, 472, 473, 727, 767, 798–802, 807, 808; 388/934

(56) References Cited

U.S. PATENT DOCUMENTS

| | | | | |
|---|---|---|---|---|
| 4,590,413 A | * | 5/1986 | Gritter et al. ............... | 318/803 |
| 4,644,239 A | * | 2/1987 | Yoshikawa et al. .......... | 318/641 |
| 4,953,053 A | * | 8/1990 | Pratt ....................... | 318/476 X |
| 5,313,151 A | * | 5/1994 | Ogden et al. ............... | 318/805 |
| 5,444,344 A | * | 8/1995 | Vincent ...................... | 318/599 |
| 5,838,133 A | * | 11/1998 | McCann ...................... | 318/701 |
| 5,875,414 A | * | 2/1999 | Tsutsumi ................ | 318/811 X |
| 5,977,740 A | * | 11/1999 | McCann ...................... | 318/701 |
| 6,121,735 A | * | 9/2000 | Igeta et al. ................. | 318/101 |

* cited by examiner

*Primary Examiner*—Bentsu Ro
(74) *Attorney, Agent, or Firm*—Michael M. Rickin

(57) ABSTRACT

A method for operating an actuating drive for controlling fittings. The actuating drive has an electric motor which is fed from a frequency converter and moves a fitting with a predetermined torque via a self-locking gearbox. In order to protect the actuating drive against unacceptable, destructive heating while maintaining operation in the surrounding process installation when an excess temperature occurs, the temperature of the actuating drive is measured during continuous operation, and the rotation speed of the electric motor is reduced as a function of the measured temperature while maintaining the torque. To this end, the amplitude and the frequency of the output voltage of the frequency converter are reduced in proportion to one another.

15 Claims, 3 Drawing Sheets

METHOD FOR OPERATING AN ACTUATING DRIVE

FIELD OF THE INVENTION

The invention relates to a method for operating an actuating drive for controlling fittings and of the type wherein an electric motor that is fed from a frequency converter moves a fitting with a predetermined torque through a self-locking gearbox and more particularly to controlling the temperature of the drive.

DESCRIPTION OF THE PRIOR ART

Actuating drives are used for process automation in a process installation, in order to open and to close valves, flaps and the like.

Such an actuating drive essentially comprises an electric motor, which moves a fitting with a predetermined torque via a self-locking gearbox. If the electric motor is overloaded, the motor windings are heated unacceptably, and this can lead to damage or destruction of the motor windings. Such overloads occur regularly if the fitting is jammed and the force disconnection fails at the same time.

Furthermore, the problem that arises in particular with high-power actuating drives is that self-locking gearboxes become severely heated during continuous operation, due to their low efficiency. The thermal coupling between the electric motor and the gearbox results in the electric motor being heated further.

In order to protect motor windings, it is known from the publication from the Auma Co. "Drehantriebe fur Steuerbetrieb" [Rotary drives for control operation], Issue 2.96, for the circuit for feeding the electric motor to be interrupted as soon as the winding temperature exceeds a predetermined limit value. However, this procedure is subject to the disadvantage that, throughout the entire period during which an excessive temperature is identified, the fitting is locked in its most recently assumed position, no longer reacts to control commands, and the sequence in the surrounding process installation is thus interfered with.

The invention is thus based on the object of specifying a method for operating an actuating drive for controlling fittings, which allows the actuating drive to be protected against unacceptable, destructive heating, and nevertheless allows operation of the surrounding process installation to be maintained, despite the excessive temperature.

The invention is based on an actuating drive whose electric motor is connected to a frequency converter. Such frequency converters are generally known per se and are described, for example, in DE 42 35 223. During correct use, the frequency and the output voltage of the frequency converter are set in accordance with the control object from the surrounding process installation. In this case, the rotation speed of the electric motor is set by the frequency, and the torque which is required to move the given fitting in accordance with the control task is set by the output voltage at the given frequency.

Depending on the load on the actuating drive, an amount of heat is produced in the actuating drive which is caused essentially by mechanical friction and electrical power losses. The amount of heat produced is greater than the amount of heat that can be dissipated via the surface of the actuating drive to the environment. This leads to an increase in the temperature of the actuating drive.

SUMMARY OF THE INVENTION

According to the invention, the temperature of the actuating drive is monitored, and the rotation speed of the electric motor is reduced, as a function of the measured temperature, while the torque is kept constant. To this end, the motor voltage emitted from the frequency converter is reduced in accordance with a characteristic which can be predetermined, virtually in proportion to the stator frequency.

If the torque is kept constant, the power supplied to the gearbox falls in proportion to the reduction in the drive rotation speed. The power losses which lead to heating of the gearbox fall in accordance with the efficiency $\eta$, which is governed by the gearbox design and, for self-locking gearboxes, is always $\eta \leq 0.5$.

The drive rotation speed is set so that the gearbox temperature caused by the power losses in the gearbox remains below the predetermined limit value. The actuating drive is advantageously protected against excessive temperature increases, while nevertheless remaining ready to operate during periods when the temperature is raised. This avoids disturbances in the operational sequence of the surrounding process installation.

DESCRIPTION OF THE PREFERRED EMBODIMENT(S)

Figure 1:
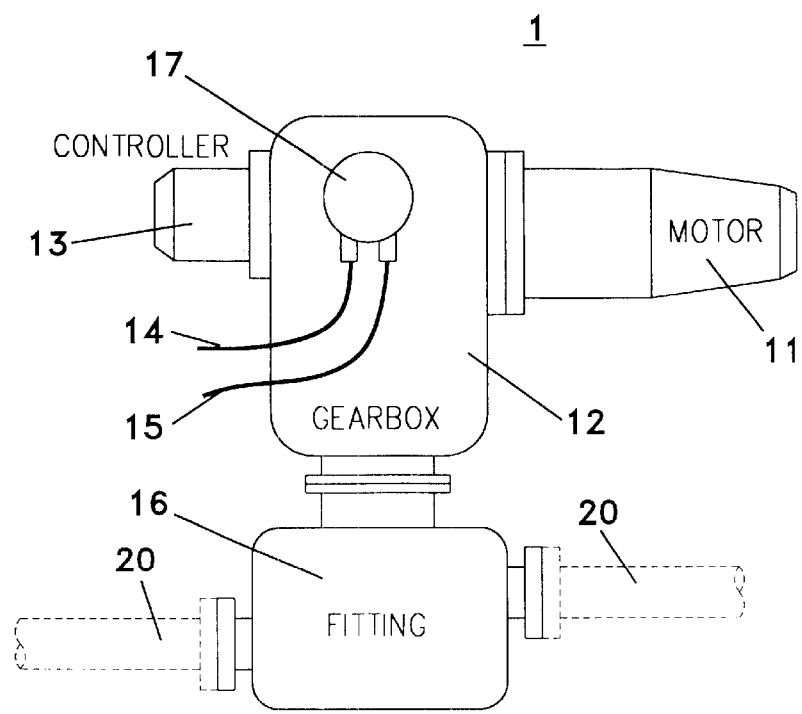
FIG. 1 shows an illustration of the fundamental design of an actuating drive.

FIG. 1 illustrates the basic design of an actuating drive 1. The actuating drive 1 essentially comprises an electric motor 11 which moves a fitting 16 with a predetermined torque via a gearbox 12. The electric motor 11 is in the form of a three-phase asynchronous motor. The fitting 16 is a valve which is used to adjust the flow of a flowing medium in a transport tube 20. The gearbox 12 is self-locking, that is to say the efficiency $\eta$ of the gearbox is always $\eta \leq 0.5$. This avoids the force caused by the flowing medium inadvertently moving the fitting when the electric motor 11 is switched off.

The actuating drive 1 is equipped with an electrical controller 13, which is flange-connected to the gearbox 12. Furthermore, a connection box 17 is provided for connecting cables to the power supply 14 and for feeding in control signals 15, and is mounted on the gearbox 12.

Figure 2:
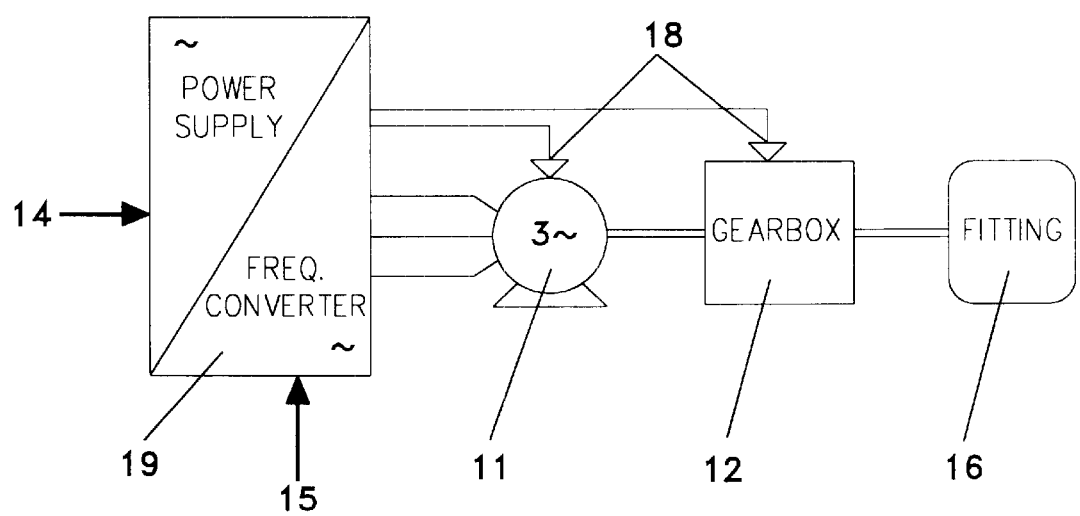
FIG. 2 shows an outline illustration of the power flow in an actuating drive.

Using the same reference symbols for the same means, FIG. 2 illustrates the basic power flow in the actuating drive 1. In this case, the electrical controller 13 is a frequency converter 19, which is connected to the power supply 14. The power supply 14 is formed by the public AC mains system. The three-phase AC voltage, at a fixed frequency and fixed amplitude, is converted by the frequency converter 19, and as a function of control signals 15, into a three-phase AC voltage at a variable frequency f with a variable amplitude U. For a simple actuating drive 1 for respectively completely opening and closing the fitting 16, the control signals 15 are limited to clockwise running and anticlockwise running of the electric motor 11, and the electric motor 11 being at rest.

The output voltage of the frequency converter 19 is connected to the stator windings of the three-phase asynchronous motor 11. The rotation speed n of the rotor of the electric motor 11 is set by the frequency f, where n~f and the torque M at the given frequency f, by means of the amplitude U of the output voltage where M~$U^2$/$f^2$. The correlation of these values is stored in the electrical controller 13.

The rotor shaft of the electric motor 11 is mechanically coupled to the input drive train of the gearbox 12, and the output drive train of the gearbox 12 is mechanically coupled to the fitting 16.

While the actuating drive 1 is being used correctly, an amount of heat is produced in the actuating drive as a function of the load, which is caused in the self-locking gearbox 12 by the maximum efficiency of 50% due to mechanical friction, and in the electric motor 11 essentially by resistive losses in the windings. In order to protect the actuating drive 1 against unacceptable, destructive heating, the temperature $\vartheta$ of the actuating drive 1 is monitored by at least one temperature sensor 18.

A first embodiment provides for the temperature $\vartheta$ of the actuating drive 1 to be measured on the gearbox 12. In this case, the heating of the actuating drive 1 resulting from the high power losses in the gearbox 12 when it is loaded dynamically is advantageously detected, this being at least half of the power supplied by the electric motor 11.

A second embodiment provides for the temperature $\vartheta$ of the actuating drive 1 to be measured on the electric motor 11. In this case, the heating of the actuating drive 1 resulting from resistive losses in the windings of the electric motor 11 when loaded in the steady state is advantageously detected, and occurs when the fitting 16 is jammed.

A third embodiment provides for the temperature $\vartheta$ of the actuating drive 1 to be measured on the electric motor 11 and on the gearbox 12. In this case, both the heating of the actuating drive 1 due to the high power losses in the gearbox 12 when it is loaded dynamically and the heating of the actuating drive 1 resulting from the resistive losses in the windings of the electric motor 11 when it is loaded in the steady state are advantageously detected. The further processing is in this case governed by the respectively higher measured temperature.

The rotation speed n of the electric motor 11 is reduced as a function of the measured temperature $\vartheta$, while the torque M is kept constant. The power supplied to the gearbox 12 is proportional to the product of the torque M and the rotation speed n on the input drive train P~M * n. In consequence, the power supplied to the gearbox 12 falls in proportion to the reduction in the rotation speed n. Thus, for a given efficiency $\eta \leq 0.5$, the power losses converted into heat in the gearbox 12 also fall in proportion to the reduction in the rotation speed n.

Figure 3:
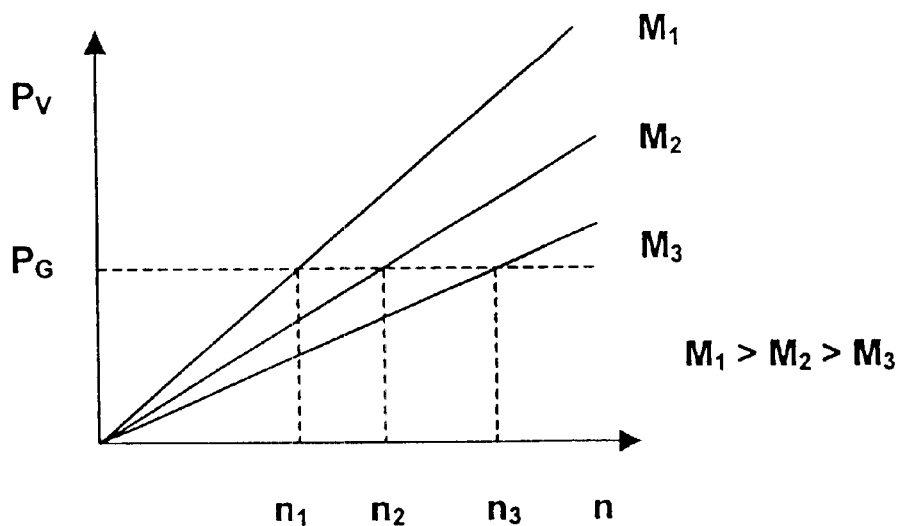
FIG. 3 shows a characteristic for the power losses from the gearbox as a function of the rotation speed and the torque.

To this end, FIG. 3 shows the power losses $P_V$ in the gearbox 12 for a given efficiency $\eta$ as a function of the rotation speed n for various torques $M_1$ to $M_3$ where $M_1 > M_2 > M_3$. The reference symbol $P_G$ in this case denotes precisely the power loss $P_V$, whose equivalent amount of heat is emitted via the surface of the gearbox 12 to the environment, while maintaining a constant gearbox temperature. In accordance with the relationship P~M * n, one and only one rotation speed $n_1$ to $n_3$ is associated with each torque $M_1$ to $M_3$ and, for a given temperature, the power loss at this rotation speed is $P_V = P_G$.

Accordingly, when the rotation speed $n_1$ is set for a given torque $M_1$, the power loss converted into heat is precisely $P_V = P_G$, which equivalent amount of heat is emitted via the surface of the gearbox 12 to the environment while maintaining a constant gearbox temperature. The same applies to the rotation speed/torque pairs $n_2/M_2$ and $n_3/M_3$ for further given torques. Based on the relationship P~M * n and verified by the illustration in FIG. 3, it can be seen that greater rotation speeds $n_1 < n_2 < n_3$ are permissible in order to limit the power loss $P_V$ to the power loss $P_V = P_G$ which is permissible in order to maintain a constant gearbox temperature at relatively low torques $M_1 > M_2 > M_3$, and vice versa.

The rotation speed n on the input drive train of the gearbox 12 is equal to the rotation speed n of the rotor shaft of the electric motor 11. The rotation speed n of the rotor shaft of the electric motor 11 is set via the frequency f of the output voltage of the frequency converter 19. The torque M at a given frequency f~n is set by the amplitude U of the output voltage, where M~$U^2/f^2$, depending on the control task from the surrounding process installation.

Figure 4:
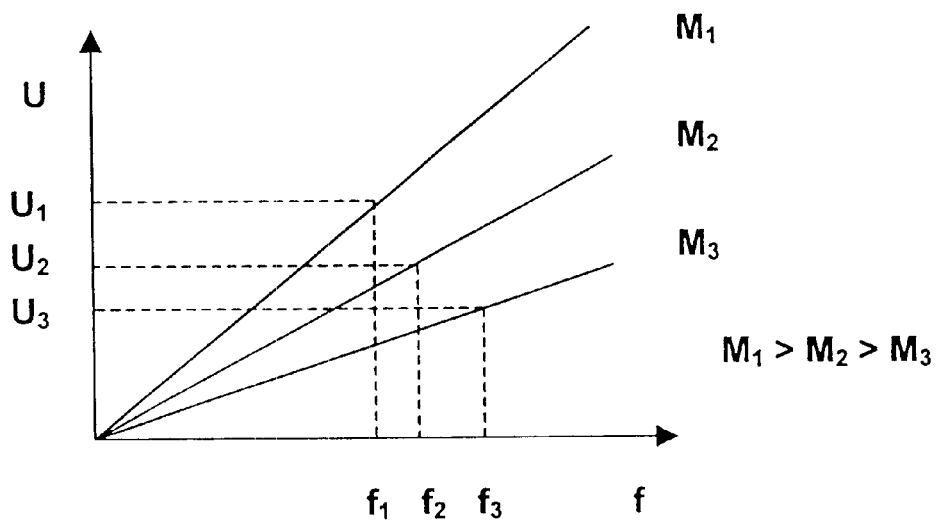
FIG. 4 shows a characteristic to illustrate the relationship between the motor torque and the voltage and frequency.

FIG. 4 shows a characteristic of the relationship between the torque of the motor and the amplitude U and frequency f of the output voltage of the frequency converter 19 for various torques $M_1$ to $M_3$ where $M_1 > M_2 > M_3$. The association between the rotation speed $n_1$ to $n_3$ and each torque $M_1$ to $M_3$ result, via the relationship f~n in frequencies $f_1$ to $f_3$, where one frequency $f_1$ to $f_3$, and only one such frequency, is associated with each torque $M_1$ to $M_3$. The associated amplitude $U_1$, $U_2$ and $U_3$ of the output voltage is determined using the relationship between the torque M~$U^2/f^2$ and the frequency f~n and amplitude U of the output voltage for each rotation speed/torque pair $n_1/M_1$, $n_2/M_2$ and $n_3/M_3$.

For a given actuating drive 1 having a thermal transfer response to the environment which is determined by the design and is thus predetermined, the power loss $P_V = P_G$ which is acceptable to maintain a constant gearbox temperature is defined for each ambient temperature. For the given actuating drive 1, the associated frequency f and amplitude U of the output voltage of the frequency converter 19 are described uniquely by a respective triple [M, f, U] for each torque M required by the control task. The totality of all the triples for a given actuating drive 1 are combined in a characteristic which is stored in the controller 13.

The rotation speed n is chosen in a suitable way to limit the power loss in the gearbox 12 to a value which allows the amount of heat produced by the power losses to be dissipated via the surface of the gearbox 12 to the environment while maintaining a predetermined gearbox temperature.

To this end, a preferred embodiment provides that the amplitude of the temperature of the actuating drive 1 is measured continuously and the rotation speed n is reduced continuously, in proportion to the temperature rise, while the torque M is kept constant. In this case, the rotation speed n is set by the frequency f, and the torque M to be maintained at a given frequency f is set by the amplitude U of the output voltage of the frequency converter 19.

Figure 5:
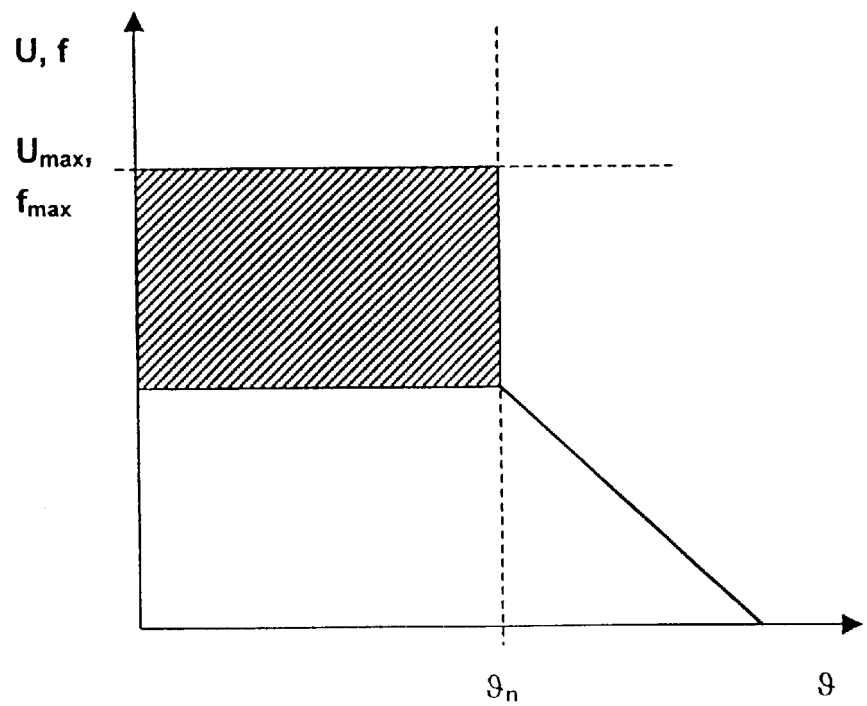
FIG. 5 shows an illustration of permissible voltages and frequencies for the frequency converter, as a function of the temperature of the actuating drive, with continuous adaptation.

FIG. 5 shows the range of permissible amplitudes U and frequencies f plotted against the temperature of the actuating drive 1 for this purpose. For a gearbox temperature $\vartheta$ below the nominal value $\vartheta_n$, $\vartheta < \vartheta_n$, all the frequencies $f \leq f_{max}$ and amplitudes $U \leq U_{max}$ are permissible. For gearbox temperatures $\vartheta$ above the nominal value $\vartheta_n$, $\vartheta > \vartheta_n$, each gearbox temperature $\vartheta$ has one, and only one, associated frequency f and amplitude U for a predetermined torque M.

In this case, the amount of heat produced for each temperature of the actuating drive 1 via the power losses is advantageously precisely that which is emitted to the environment while maintaining the present temperature. In consequence, at all temperatures, the fitting 16 is set to the respective maximum permissible movement rate, corresponding to the control task from the surrounding process installation.

An alternative embodiment provides that, as soon as the continuously measured temperature $\vartheta$ of the actuating drive 1 exceeds a predetermined nominal value $\vartheta_n$, the rotation speed n is set to a reduced, fixed value which, for a torque M which is being kept constant, is selected such that a predetermined temperature limit value $\vartheta_G$ is reached as a maximum, but is not exceeded, during further operation of the actuating drive 1. In this case, the rotation speed n is set by the frequency f, and the torque M to be maintained at a given frequency f is set by the amplitude U of the output voltage of the frequency converter 19.

Figure 6:
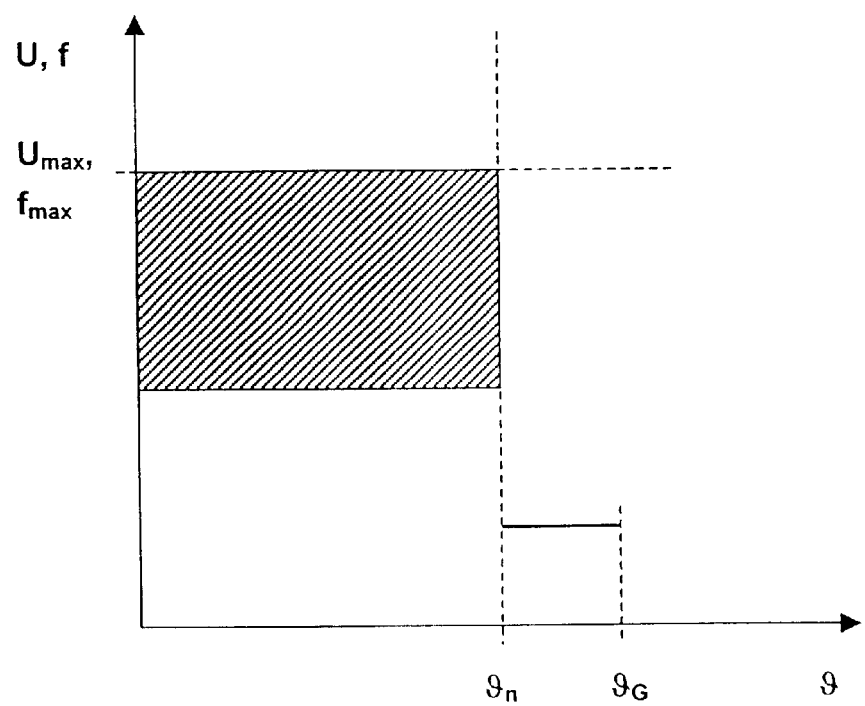
FIG. 6 shows an illustration of permissible voltages and frequencies of the frequency converter, as a function of the temperature of the actuating drive, with fixed adaptation.

FIG. 6 shows the range of permissible amplitudes U and frequencies f, plotted against the temperature of the actuating drive 1, for this purpose. If the gearbox temperature $\vartheta$ is below the nominal value $\vartheta_n$, $\vartheta < \vartheta_n$, all the frequencies $f \leq f_{max}$ and amplitudes $U \leq U_{max}$ are permissible. For gearbox temperatures $\vartheta$ above the nominal value $\vartheta_n$, $\vartheta > \vartheta_n$, the frequency f and the amplitude U of the output voltage of the frequency converter 19 are set such that they are fixed for a given torque M.

It is to be understood that the description of the preferred embodiment(s) is (are) intended to be only illustrative, rather than exhaustive, of the present invention. Those of ordinary skill will be able to make certain additions, deletions, and/or modifications to the embodiment(s) of the disclosed subject matter without departing from the spirit of the invention or its scope, as defined by the appended claims.

What is claimed is:

1. A method for operating an actuating drive for controlling fittings, wherein said actuating drive has an electric motor which is fed from a frequency converter and moves a fitting with a predetermined torque by way of a self-locking gearbox, said method comprising the steps of:
   (a) measuring the temperature $\vartheta$ of said actuating drive during continuous operation; and
   (b) reducing the rotation speed n of said electric motor as a function of said, measured temperature $\vartheta$ while maintaining the torque M, by reducing the amplitude U and the frequency f of the output voltage of said frequency converter in proportion to one another.

2. The method of claim 1 wherein the amplitude of said actuating drive measured temperature $\vartheta$ is measured continuously, and said rotation speed n is reduced continuously, in proportion to the temperature rise while said torque M is kept constant.

3. The method of claim 2 wherein said temperature $\vartheta$ of said actuating drive is measured on said gearbox.

4. The method of claim 2 wherein said temperature $\vartheta$ of said actuating drive is measured on said electric motor.

5. The method of claim 2 wherein said temperature $\vartheta$ of said actuating drive is measured on both said gearbox and said electric motor.

6. The method of claim 2 wherein any increase of said temperature $\vartheta$ of said actuating drive is signaled to a remote control station.

7. The method of claim 1 wherein the amplitude of said actuating drive measured temperature $\vartheta$ is measured continuously, and, while said torque M is kept constant, the rotation speed n is set to a reduced, fixed value as soon as the continuously measured temperature $\vartheta$ of said actuating drive exceeds a predetermined nominal value $\vartheta_n$.

8. The method of claim 7 wherein said temperature $\vartheta$ of said actuating drive is measured on said gearbox.

9. The method of claim 7 wherein said temperature $\vartheta$ of said actuating drive is measured on said electric motor.

10. The method of claim 7 wherein said temperature $\vartheta$ of said actuating drive is measured on both said gearbox and said gearbox.

11. The method of claim 7 wherein any increase of said temperature $\vartheta$ of said actuating drive is signaled to a remote control station.

12. The method of claim 1 wherein said temperature $\vartheta$ of said actuating drive is measured on said gearbox.

13. The method of claim 1 wherein said temperature $\vartheta$ of said actuating drive is measured on said electric motor.

14. The method of claim 1 wherein said temperature $\vartheta$ of said actuating drive is measured on both said gearbox and said electric motor.

15. The method of claim 1 wherein any increase of said temperature $\vartheta$ of said actuating drive is signaled to a remote control station.

* * * * *